US011480502B2

(12) United States Patent
Germain et al.

(10) Patent No.: US 11,480,502 B2
(45) Date of Patent: Oct. 25, 2022

(54) METHOD AND COMPOSITION FOR OPTICAL CLEARING OF TISSUES

(71) Applicant: The United States of America, as represented by the Secretary, Department of Health and Human Services, Bethesda, MD (US)

(72) Inventors: Ronald N. Germain, Potomac, MD (US); Weizhe Li, Clarksville, MD (US); Michael Y. Gerner, Seattle, WA (US)

(73) Assignee: United States of America, as represented by the Secretary, Department of Heatlth and Human Service, Bethesda, MD (US)

(*) Notice: Subject to any disclaimer, the term of this patent is extended or adjusted under 35 U.S.C. 154(b) by 753 days.

(21) Appl. No.: 16/328,553

(22) PCT Filed: Aug. 29, 2017

(86) PCT No.: PCT/US2017/049133
§ 371 (c)(1),
(2) Date: Feb. 26, 2019

(87) PCT Pub. No.: WO2018/044899
PCT Pub. Date: Mar. 8, 2018

(65) Prior Publication Data
US 2020/0209117 A1    Jul. 2, 2020

Related U.S. Application Data

(60) Provisional application No. 62/380,593, filed on Aug. 29, 2016.

(51) Int. Cl.
G01N 1/00    (2006.01)
G01N 1/30    (2006.01)

(52) U.S. Cl.
CPC .......... G01N 1/30 (2013.01); G01N 2001/302 (2013.01)

(58) Field of Classification Search
None
See application file for complete search history.

(56) References Cited

U.S. PATENT DOCUMENTS 6,472,216 B1    10/2002  Chiang
2006/0182750 A1  8/2006  Chari et al.
(Continued)

FOREIGN PATENT DOCUMENTS

EP      3 035 026 A1   6/2016
WO    WO 2013/55064 A1  10/2013
(Continued)

OTHER PUBLICATIONS

Albanese et al., "Whole-brain imaging reaches new heights (and lengths)," eLife, e13367: 1-3 (2016).
(Continued)

Primary Examiner — Jyoti Nagpaul
(74) Attorney, Agent, or Firm — Leydig Voit and Mayer, Ltd.

(57) ABSTRACT

Disclosed are compositions, methods, and kits for clearing tissue that preserve cellular morphology, reporter fluorescence, and epitope labeling which allow for quantitative phenotypic analysis of intact organs. The compositions include, for example, a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and at least one non-ionic density gradient medium. Also disclosed are methods for clearing tissue comprising positioning a tissue in a tissue clearing composition and allowing a tissue clearing composition to permeate the
(Continued)

tissue. Further disclosed are methods for visualizing tissue characteristics which involve fixing a tissue, staining the tissue, positioning the tissue in the tissue clearing composition and allowing the tissue clearing composition to permeate the tissue, and imaging the tissue utilizing a microscope or tissue scanning device.

21 Claims, 7 Drawing Sheets

(56) References Cited

U.S. PATENT DOCUMENTS

| | | | |
|---|---|---|---|
| 2012/0016141 | A1 | 1/2012 | Shih et al. |
| 2016/0003716 | A1 | 1/2016 | Torres et al. |
| 2016/0123854 | A1 | 5/2016 | Gradinaru et al. |
| 2017/0160170 | A1 | 6/2017 | Lin |

FOREIGN PATENT DOCUMENTS

| | | |
|---|---|---|
| WO | WO 2014/025392 A1 | 2/2014 |
| WO | WO 2015/041755 A1 | 3/2015 |
| WO | WO 2016/023009 A1 | 2/2016 |
| WO | WO 2016/117614 A1 | 7/2016 |

OTHER PUBLICATIONS

Chung et al., "Structural and Molecular Interrogation of Intact Biological Systems," Nature, 497(7449): 332-337, Author Manuscript (2014).
Conrad et al., "Aqueous chamber drug distribution volume measurement in rabbits," J. Pharm. Sci., 66(2): 219-224 (1977).
Dodt et al., "Ultramicroscopy: Three-Dimensional Visualization of Neuronal Networks in the Whole Mouse Brain," Nat. Methods, 4(4): 331-336 (2007).
Erturk et al., "Three-Dimensional Imaging of Solvent-Cleared Organs Using 3DISCO," Nat. Protoc., 7(11): 1983-1995 (2012).
Fonseca et al., "Microbiota-Dependent Sequelae of Acute Infection Compromise Tissue-Specific Immunity," Cell. 163(2): 354-366 (2015).
Gerner el al., "Histo-Cytometry: A Method for Highly Multiplex Quantitative Tissue Imaging Analysis Applied to Dendritic Cell Subset Microanatomy in Lymph Nodes," Immunity, 37(2): 364-376 (2012).
Gerner et al., "Strategically Localized Dendritic Cells Promote Rapid T Cell Responses to Lymph-node Particulate Antigens," Immunity, 42(1): 172-185 (2015).
Hama et al., "Scales: An Optical Clearing Palette for Biological Imaging," Nat. Neurosci., 18(10): 1518-1529 (2015).
Hama et al., "Scale: A Chemical Approach for Fluorescence Imaging and Reconstruction of Transparent Mouse Brain," Nat. Neurosci., 14(11): 1481-1488 (2011).
Hamdan et al., "Optical Coherence Tomography: From Physical Principles to Clinical Applications." Arch. Cardiovasc. Dis., 105(10): 529-534 (2012).
International Preliminary Report on Patentability, Application No. PCT/US2017/049133, dated Mar. 5, 2019

International Search Report, Application No. PCT/US2017/049133, dated Nov. 21, 2017.
Ke et al., "SeeDB: A Simple and Morphology-Preserving Optical Clearing Agent for Neuronal Circuit Reconstruction," Nat. Neurosci., 16(8): 1154-1161 (2013).
Kuwajima et al., "ClearT: A Detergent- and Solvent-Free Clearing Method for Neuronal and Non-Neuronal Tissue," Development, 140(6): 1364-1368 (2013)
Lee et al., "Tissue-Specific Distribution of iNKT Cells Impacts Their Cytokine Response," Immunity, 43(3): 566-578 (2015).
Li et al., "Multiplex, quantitative cellular analysis in large tissue volums with clearing-enhanced 3D microscopy ($C_e3D$)," Proc. Natl. Acad. Sci., 114 (35), E-7321-E-7330 (2017).
Liu et al., "Immune Homeostasis Enforced by Co-Localized Effector and Regulatory T Cells," Nature, 528(7581): 225-230, Author Manuscript (2015).
Murray et al., "Simple, Scalable Proteomic: Imaging for High-Dimensional Profiling of Intact System," Cell, 163(6): 1500-1514 (2015).
Oh et al., "A Mesoscale Connectome of the Mouse Brain," Nature, 508(7495): 207-214, Author Manuscript (2014).
Petrovas et al., "CD4 T Follicular Helper Cell Dynamics During SIV Infection," J. Clin. Invest., 122(9): 3281-3294 (2012).
Radtke et al., "Lymph-node Resident CD8 α + Dendritic Cells Capture Antigens from Migratory Malaria Sporozoites and Induce CD8+ T Cell Responses," PLOS Pathog., 11(2): 1-23 (2015).
Ravin et al., "Preformulation," Remington's Pharmaceutical Sciences, Ch. 45, 1435-1450 (1990).
Renier et al., "iDISCO: A Simple, Rapid Method to Immunolabel Large Tissue Samples for volume Imaging," Cell, 159(4): 896-910 (2014).
Richardson et al., "Clarifying Tissue Clearing," Cell, 162(2): 246-257 (2015).
Scott et al., "Tissue Optical Clearing, Three-Dimensional Imaging, and Computer Morphometry in Whole Mouse Lungs and Human Airways," Am. J. Respir. Cell Mol. Biol., 51(1): 43-55 (2014).
Steinert et al., "Quantifying Memory CD8 T Cells Reveals Regionalization of Immunosurvelllance," Cell, 161(4): 737-749 (2015).
Susaki et al., "Whole-brain imaging with single-cell resolution using chemical cocktails and computational analysis," Cell, 157(3): 726-739 (2014).
Tainaka et al., "Whole-Body Imaging with Single-Cell Resolution by Tissue Decolorization," Cell, 159(4): 911-924 (2014).
Tang et al., "The Future of Immunoimaging-Deeper, Bigger, More Precise, and Definitively More Colorful," Eur. J. Immunol., 43(6): 1407-1412 (2013).
Technical Data Sheet, BD Sciences, "Perm/Wash buffer," 1-2 (2007).
Torabi-Parizi et al., "Pathogen-Related Differences in the Abundance of Presented Antigen are Reflected in CD+ T Cell Dynamic Behavior and Effector Function in the Lung," J. Immunol., 192(4): 1651-1660 (2014).
Treweek et al., "Whole-body tissue stabilization and selective extractions via tissue-hydrogel hybrids for high-resolution intact circuit mapping and phenotyping," Nat. Protocol., 10(11): 1860-1896 (2015).
Written Opinion of the International Searching Authority, Application No. PCT/US2017049133, dated Nov. 21, 2017.
Yang et al., "Single-Cell Phenotyping within Transparent Intact Tissue through Whole-Body Clearing," Cell, 158(4): 945-958 (2014).

METHOD AND COMPOSITION FOR OPTICAL CLEARING OF TISSUES

CROSS REFERENCE TO RELATED APPLICATIONS

This patent application is a U.S. National Phase Application of International Patent Application No. PCT/US2017/049133, filed Aug. 29, 2017, which claims the benefit of U.S. Provisional Patent Application No. 62/380,593 filed Aug. 29, 2016, each of which is incorporated herein by reference in its entirety for all purposes.

STATEMENT REGARDING FEDERALLY SPONSORED RESEARCH OR DEVELOPMENT

This invention was made with Government support under project number ZIAAI000545-27 by the National Institutes of Health, National Institute of Allergy and Infectious Diseases. The Government has certain rights in the invention.

BACKGROUND OF THE INVENTION

Major physiological processes rely on the precise positioning of diverse cell types in specific anatomical locations. Such organization allows for exposure of cells to appropriate tissue microenvironments that shape their differentiation, promote appropriate cell-cell communication events, and collectively define the global properties of the whole organ. Understanding these structure-function relationships requires a detailed mapping of both the large-scale organization and fine-grained molecular and cellular composition of complex tissues.

The majority of information to date of such organization at the cell and subcellular levels comes from microscopic examination of relatively thin (e.g., 5 to 20 micrometer) two dimensional tissue cross-sections. Although providing an excellent framework for understanding general features of a tissue and the respective positioning of well-represented cell populations, such data lack information on three dimensional organization, being particularly limiting for irregular structures such as the vasculature, airways, nervous tissue, inflamed sites, tumors, or reactive lymph nodes. Furthermore, detection and analysis of rare cellular events requires imaging of a large number of disconnected sections, which introduces possible image selection bias and suffers from the potential omission of key physiological landmarks located just outside of the sampled area. These challenges in two dimensional image analyses can lead to significant errors in interpretation of tissue organization, physiology, and cellular localization and function.

Other imaging techniques allow capture of substantial volumetric information while providing some collection of cellular and molecular detail. Serial sectioning followed by three dimensional reconstruction can achieve whole-organ imaging, but is time consuming, requires specialized equipment and training and still generates section-based artifacts (see e.g., Oh, S. W., et al., *A Mesoscale Connectome of the Mouse Brain*, Nature, 508(7495):207-14 (2014)).

Alternatively, 2-photon microscopy can penetrate tissues to relatively large depths without sectioning, but requires specialized microscopy systems that are very expensive, is limited to select fluorophores, has modest capacity for dense multiplex analysis, and typically only allows visualization of small volumes in experimental animal and human tissues (Tang, J., et al., *The Future of Iminunoimaging—Deeper, Bigger, More Precise, and Definitively More Colorful, Eur.* J. Immunol, 43(6):1407-12 (2013)). Optical coherence tomography achieves large volumetric reconstruction of tissue architecture, but is limited in resolution (i.e., 1 to 15 micrometers) and lacks the capacity to interrogate molecular and cellular level information for diverse analytes of interest (Hamdan, R., et al., *Optical Coherence Tomography: From Physical Principles to Clinical Applications*, Arch. Cardiovasc. Dis., 105(10):529-34 (2012)).

Flow cytometry is a tool which allows for highly quantitative analysis of complex populations of cells. In order for flow cytometry to work, however, individual cells must be suspended in a stream of fluid. The disadvantage of this method is that the cells lose their tissue localization.

Histo-cytometry is an imaging and analysis pipeline that provides multiplex phenotypic identification and quantification of cells directly in tissues, similar to flow cytometry. Histo-cytometry has been successfully utilized to study the composition, distribution and function of cells with complex morphology in tissue sections (Gerner, M. Y., et al., *Histo-Cytometry: A Method for Highly Multiplex Quantitative Tissue Imaging Analysis Applied to Dendritic Cell Subset Microanatomy in Lymph Nodes*, Immunity, 37(2): 364-76 (2012); Gerner, M. Y., et al., *Strategically Localized Dendritic Cells Promote Rapid T Cell Responses to Lymph-node Particulate Antigens*, Immunity, 42(1):172-85 (2015); Fonseca, D. M., et al., *Microbiota-Dependent Sequelae of Acute Infection Compromise Tissue-Specific Immunity*, Cell, 163 (2):354-66 (2015); Liu, Z., et al., *Immune Homeostasis Enforced by Co-Localized Effector and Regulatory T Cells*, Nature, 528(7581):225-30 (2015); Radtke, A. J., et al., *Lymph-node Resident CD8 $\alpha^+$ Dendritic Cells Capture Antigens from Migratory Malaria Sporozoites and Induce $CD8^+$ T Cell Responses*, PLOS Pathog., 11(2):1-23 (2015), Petrovas, C., et al., *CD4 T Follicular Helper Cell Dynamics During SIV Infection*, J. Clin. Invest., 122(9):3281-94 (2012); Torabi-Parizi, P., et al., *Pathogen-Related Differences in the Abundance of Presented Antigen are Reflected in $CD4^+$ T Cell Dynamic Behavior and Effector Function in the Lung*, J. Immunol., 192(4):1651-60 (2014); and Lee, Y. J., et al., *Tissue-Specific Distribution of iNKT Cells Impacts Their Cytokine Response*, Immunity, 43(3):566-78 (2015). Even for cell types with relatively simple morphology, such as T and B lymphocytes, Histo-cytometry requires a high degree of spatial signal resolution, achieved with high numerical aperture (NA) objectives and deconvolution algorithms, to accurately assess the properties of tightly packed cells that often have overlapping molecular profiles. The ability to simultaneously detect multiple distinct probes is critical for this technique, as it allows in-depth in situ phenotypic analysis including definition of cellular lineage, analysis of ongoing signaling events through phospho-protein detection, and delineation of functional states such as cytokine production (Liu, Z., et al., *Immune Homeostasis Enforced by Co-Localized Effector and Regulatory T Cells*, Nature, 528(7581):225-30 (2015)). Furthermore, this analytical imaging approach can achieve more accurate cellular enumeration as compared to conventional disassociation-based flow cytometry techniques, especially for highly adherent cell types or difficult to work with organs (Gerner, M. Y., et al., *Histo-Cytometry: A Method for Highly Multiplex Quantitative Tissue Imaging Analysis Applied to Dendritic Cell Subset Microanatomy in Lymph Nodes*, Immunity, 237(2): 364-76 (2012) and Steinert, E. M., et al., *Quantifying Memory CD8 T Cells Reveals Regionalization of Immunosurveillance*, Cell, 161(4):737-49 (2015)).

Recently, several clearing methodologies have been developed that render tissues transparent and allow section-free imaging over significant volumes with either conventional confocal microscopes or high-speed light sheet systems (see, e.g., Erturk, A., et al., *Three-Dimensional Imaging of Solvent-Cleared Organs Using 3DISCO*, Nature Protocols, 7(11):1983-1995 (2012); Renier, N., et al., *iDISCO: A Simple, Rapid Method to Immunolabel Large Tissue Samples for Volume Imaging*. Cell, 159(4):896-910 (2014); Hama, H., et al., *Scales: An Optical Clearing Palette for Biological Imaging*, Nat. Neurosci., 18(10):1518-29 (2015); Hama, H., et al., *Scale: A Chemical Approach for Fluorescence Imaging and Reconstruction of Transparent Mouse Brain*, Nat. Neurosci., 14(11):1481-8 (2011); Tainaka, K., et al., *Whole-Body Imaging with Single-Cell Resolution by Tissue Decolorization*, Cell, 159(4):911-924 (2014); Chung, K., et al., *Structural and Molecular Interrogation of Intact Biological Systems*, Nature, 497(7449): 332-7 (2014); Yang, B., et al., *Single-Cell Phenotyping within Transparent Intact Tissue through Whole-Body Clearing*, Cell, 158(4):945-958 (2014); Murray, E., et al., *Simple, Scalable Proteomic: Imaging for High-Dimensional Profiling of Intact System*, Cell, 163(6):1500-14 (2015); Dodt, H. U., et al., *Ultramicroscopy: Three-Dimensional Visualization of Neuronal Networks in the Whole Mouse Brain*, Nat. Methods, 4(4):331-6 (2007); Kuwajima, T., et al., *ClearT: A Detergent-and Solvent-Free Clearing Method for Neuronal and Non-Neuronal Tissue*, Development, 140 (6):1364-8 (2013); and Ke, et al., *See DB: A Simple and Morphology-Preserving Optical Clearing Agent for Neuronal Circuit Reconstruction*, Nat. Neurosci., 16(8):1154-61 (2013)). These techniques work by reducing light scattering in tissues through minimizing refractive index mismatches between the immersion medium and the various protein, aqueous, and lipid tissue constituents (Richardson, D. S. and J. W. Lichtman, *Clarifying Tissue Clearing*, Cell, 162(2): 246-57 (2015)). Each of the currently reported clearing techniques, however, suffers to some extent from various method-specific limitations, such as loss of reporter protein fluorescence, incompatibility with immunolabeling, disruption of tissue and cellular morphology, poor signal quality, and inability to provide large-scale structural organization when providing high fidelity information on single cell morphology and molecular phenotype. For example, many of the currently reported clearing techniques fail to preserve the capacity to retain intrinsic reporter fluorescence (e.g., GFP, DsRed, tdTomato) and allow multiplex immunostaining. The currently reported clearing techniques that allow immunostaining typically require the use of sandwich stains (a primary antibody and then a fluorescently labelled secondary antibody) which limit the capacity for multiplex analysis because multiple mouse antibodies cannot be simultaneously used because the secondary will not distinguish among them.

An unmet need continues to exist for methods to gather information, such as morphology and molecular phenotype, from single cells while preserving their tissue localization. Specifically, there is an unmet need for compositions and methods for increasing tissue transparency that allow for preservation of cellular morphology, reporter fluorescence, epitope labeling, and/or quantitative phenotypic analysis, including high sensitivity for probe detection to enable use of multiple individually labeled antibodies.

BRIEF SUMMARY OF THE INVENTION

Organ homeostasis, cellular differentiation, signal relay, and in situ function all depend on the spatial organization of cells in complex tissues. For this reason, comprehensive, high resolution mapping of cell positioning, phenotypic identity, and biological state in the context of macro-scale tissue structure is critical to a deeper understanding of developmental processes as well as physiological and pathophysiological processes. The present invention is based on a surprising and unexpected discovery of a composition and methods of using the composition, that is easy to use, inexpensive, provides excellent tissue transparency, preserves cellular morphology and protein fluorescence and is fully compatible with antibody based immunolabeling. The discovery is unexpected, in part, because many other compounds did not provide adequate clearing results and/or were incompatible with staining and/or quenched endogenous reporter protein fluorescence (see Example 6).

Further, this enhanced signal quality and capacity for extensive probe multiplexing permits quantitative analysis of distinct, highly intermixed cell populations in intact tissues via three-dimensional Histo-cytometry. This invention is expected to provide new information about cellular interactions and distributions in simple and complex tissues.

The present invention provides, in one embodiment, compositions for tissue clearing comprising a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and at least one non-ionic density gradient medium.

In another embodiment, the present invention provides a method of clearing tissue comprising positioning a tissue in a tissue clearing composition of the present invention and allowing the tissue clearing composition of the present invention to permeate the tissue.

In another embodiment, the present invention provides methods for visualizing tissue characteristics comprising fixing a tissue, staining the tissue, positioning a tissue in a tissue clearing composition of the present invention and allowing the tissue clearing composition of the present invention to permeate the tissue, and imaging the tissue utilizing a microscope or tissue scanning device.

DETAILED DESCRIPTION OF THE INVENTION

Figure 1:
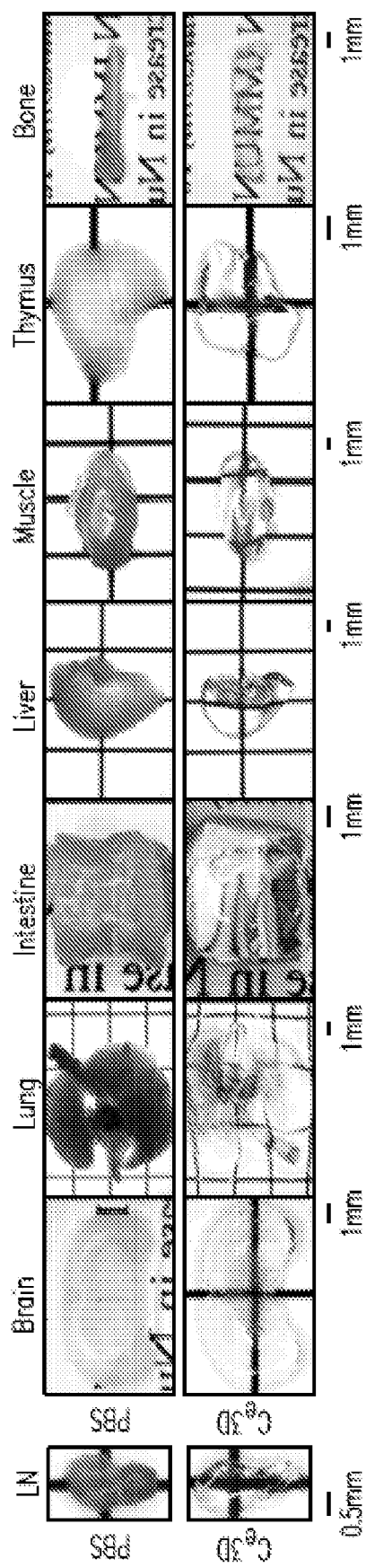
FIG. 1 depicts images showing murine tissues before (PBS) and after being cleared ($C_e3$ D) in accordance with an embodiment of the invention. Specifically, from left to right, the tissues are lymph node (LN), brain, lung, intestine, muscle, thymus, and bone.

The present invention provides, in one embodiment, a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

The present invention provides, in one embodiment, a tissue clearing composition comprising (a) a compound of formula $R^1$—C(X)—$NR^2R^3$, wherein $R^1$ is methyl, ethyl, propyl, butyl, pentyl, hexyl, halomethyl, haloethyl, halopropyl, halobutyl, halopentyl, halohexyl, hydroxymethyl, hydroxyethyl, hydroxypropyl, hydroxybutyl, hydroxypentyl, hydroxyhexyl, hydroxyhexyl, amino, methylamino, ethylamino, propylamino, butylamino, pentylamino, hexylamino, a salt thereof, or a combination thereof, and (b) at least one non-ionic density gradient medium.

In another embodiment, the present invention provides a tissue clearing composition comprising (a) a compound of formula $R^1$—C(X)—$NR^2R^3$, wherein $R^1$ is methyl, hydroxymethyl, halomethyl, amino, methylamino, a salt thereof, or a combination thereof, and (b) at least one non-ionic density gradient medium.

In any of the above embodiments, the present invention provides a tissue clearing composition comprising (a) a compound of formula $R^1$—C(X)—$NR^2R^3$, wherein $R^1$ is chloromethyl, or a salt thereof, and (b) at least one non-ionic density gradient medium.

In any of the above embodiments, the present invention provides a tissue clearing composition comprising (a) a compound of formula $R^1$—C(X)—$NR^2R^3$, wherein $R^1$ is methyl, or a salt thereof, and (b) at least one non-ionic density gradient medium.

In any of the above embodiments, the present invention provides a tissue clearing composition comprising (a) a compound of formula $R^1$—C(X)—$NR^2R^3$, wherein X is O, and (b) at least one non-ionic density gradient medium.

In any of the above embodiments, the present invention provides a tissue clearing composition comprising (a) a compound of formula $R^1$—C(X)—$NR^2R^3$, wherein $R^2$ and $R^3$ are independently H, methyl, hydroxymethyl, a salt thereof, or a combination thereof, and (b) at least one non-ionic density gradient medium.

In any of the above embodiments, the present invention provides a tissue clearing composition comprising, as component (a), N-methylacetamide, N,N-dimethylacetamide, N-ethylacetamide, N-(hydroxymethyl)acetamide, 2-hydroxy-N-methylacetamide, 2-chloro-N-(hydroxymethyl)acetamide, urea, thiourea, N,N'-dimethylurea, a salt thereof, or a combination thereof, and (b) at least one non-ionic density gradient medium.

In any of the above embodiments, the present invention provides a tissue clearing composition comprising, as component (a), N-methylacetamide, N,N-dimethylacetamide, N-ethylacetamide, a salt thereof, or a combination thereof, and (b) at least one non-ionic density gradient medium.

In any of the above embodiments, the present invention provides a tissue clearing composition comprising, as component (a), N-methylacetamide or a salt thereof, and (b) at least one non-ionic density gradient medium.

In any of the above embodiments, the present invention provides a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium, wherein the non-ionic density gradient medium contains 5-(N-2,3-dihydroxypropylacetamido)-2,4,6-triiodo-N,N'-bis(2,3-dihydroxypropyl)isophthalamide, fructose, or diatrizoic acid. Preferably, the tissue clearing composition does not comprise a sugar other than fructose.

In any of the above embodiments, the present invention provides a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium, wherein the non-ionic density gradient medium contains 5-(N-2,3-dihydroxypropylacetamido)-2,4,6-triiodo-N,N'-bis(2,3-dihydroxypropyl)isophthalamide or diatrizoic acid.

In any of the above embodiments, the present invention provides a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium, wherein the non-ionic density gradient medium contains 5-(N-2,3-dihydroxypropylacetamido)-2,4,6-triiodo-N,N'-bis(2,3-dihydroxypropyl)isophthalamide.

In another embodiment, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a tissue clearing composition comprising (a) from about 10 to about 30% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a tissue clearing composition comprising (a) from about 15 to about 25% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a tissue clearing composition comprising (a) from about 20 to about 25% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a buffer. In another embodiment, the buffer is from about 25% to about 60% volume/volume of the composition.

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a phosphate-buffered saline buffer. The phosphate-buffered saline buffer can be full strength or diluted (e.g., 1× or 0.1×).

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a buffer comprising a non-ionic surfactant.

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a buffer comprising a saponin non-ionic surfactant. The saponin can be at a concentration of from about 0.1 to about 0.5% weight/volume of the composition.

Saponins are a class of chemical compounds having one or more hydrophilic glycoside moieties combined with a lipophilic triterpene derivative. These compounds are found in various plant species and produce soap-like foaming when shaken in aqueous solutions. As used herein, "saponin" includes saponins, and salts, derivatives, and biologically active fragments thereof. An example of a saponin includes saponin from Quillaja bark (available from Sigma Aldrich).

An example of a buffer comprising saponins includes BD Perm/Wash™ buffer (available from BD Biosciences). Alternatively, a buffer comprising a saponin can be made by mixing a saponin with a buffer. For example, a 0.1%-20% (wt/vol) saponin buffer can be made.

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a buffer containing ammonium ions, chloride ions, or potassium ions, or a combination thereof.

In any of the above embodiments, the present invention provides a tissue clearing composition comprising (a) from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a non-ionic surfactant.

In any of the above embodiments, the present invention provides a tissue clearing composition comprising from about 1 to about 40% volume/volume of (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a non-ionic surfactant having a polyethylene oxide side chain and an aromatic hydrocarbon group.

In any of the above embodiments, the present invention provides a tissue clearing composition comprising from about 1 to about 40% volume/volume of (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a non-ionic surfactant having a hydrophilic polyethylene oxide side chain and a hydrophobic aromatic hydrocarbon group.

In any of the above embodiments, the present invention provides a tissue clearing composition comprising from about 1 to about 40% volume/volume of (a) a compound of formula $R^1$—C(X)—$NR^1R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a non-ionic surfactant having a hydrophilic polyethylene oxide side chain with on average about 9.5 ethylene oxide units and a 4-(1,1,3,3-tetramethylbutyl)-phenyl group (e.g., Triton™ X-100, available from Dow Chemical Company).

In any of the above embodiments, the present invention provides a tissue clearing composition comprising from about 1 to about 40% volume/volume of (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a saponin non-ionic surfactant.

In any of the above embodiments, the present invention provides a tissue clearing composition comprising from about 1 to about 40% volume/volume of (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) 1-thioglycerol. The 1-thioglycerol can be at a concentration of from about 0.1 to about 0.5% weight/volume of the composition.

In any of the above embodiments, the present invention provides a tissue clearing composition comprising from about 1 to about 40% volume/volume of a (a) compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) heparin. The heparin can be at a concentration of from about 1 to about 30 units per ml of the composition. The heparin can be at a concentration of from about 5 to about 15 units per ml of the composition. The heparin can be at a concentration of about 10 units per ml of the composition.

In any of the above embodiments, the present invention provides a tissue clearing composition comprising from about 1 to about 40% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) streptokinase. The streptokinase can be at a concentration of from about 50 to about 400 units per milliliter of the composition. The streptokinase can be at a concentration of from about 100 to about 300 units per milliliter of the composition.

In any of the above embodiments, the present invention provides a tissue clearing composition comprising (a) from about 1 to about 50% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) from about 1 to about 95% volume/volume of at least one non-ionic density gradient medium, and (c) from about 25 to about 60% volume/volume of a buffer.

In any of the above embodiments, the present invention provides a tissue clearing composition comprising (a) from about 1 to about 50% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) from about 1 to about 95% volume/volume of at least one non-ionic density gradient medium, (c) from about 25 to about 60% volume/volume of a buffer, and (d) from about 0.1 to about 0.5% volume/volume of a non-ionic surfactant.

In any of the above embodiments, the present invention provides a method of clearing tissue comprising positioning a tissue in a tissue clearing composition and allowing a tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising fixing a tissue, positioning a tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising staining a tissue, positioning a tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising fixing a tissue, staining the tissue, positioning the tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising allowing a tissue clearing composition to permeate a tissue by positioning the tissue in a tissue clearing solution for from about 1 to about 48 hours, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising fixing a tissue, positioning the tissue in acetone, and positioning the tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium. Preferably, the tissue that is positioned in acetone is a fat/adipose-rich tissue, such as tissue from a mammary gland.

In any of the above embodiments, the present invention provides a method of clearing tissue comprising allowing a tissue clearing composition to permeate a tissue by positioning the tissue in a tissue clearing solution for from about 1 to about 30 hours, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising allowing a tissue clearing composition to permeate a tissue by positioning the tissue in a tissue clearing solution for from about 1 to about 20 hours, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising allowing a tissue clearing composition to permeate a tissue by positioning the tissue in a tissue clearing solution for from about 1 to about 10 hours, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising allowing a tissue clearing composition to permeate a tissue by positioning the tissue in a tissue clearing solution at a temperature of from about 10 to about 37 degrees Celsius, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing tissue comprising allowing a tissue clearing composition to permeate a tissue by positioning the tissue in a tissue clearing solution at a temperature of from about 10 to about 30 degrees Celsius, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium.

In any of the above embodiments, the present invention provides a method of clearing mammalian tissue comprising allowing a tissue clearing composition to permeate a mammalian tissue by positioning the mammalian tissue in a tissue clearing solution, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium. Preferably, the mammalian tissue is from a mammalian organ selected from the group consisting of lymph node, brain, lung, intestine, muscle, thymus, bone, and mammary gland.

In any of the above embodiments, the present invention provides a method of visualizing tissue characteristics comprising fixing a tissue, staining the tissue, positioning the tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium, and imaging the tissue utilizing a microscope or tissue scanning device. In an embodiment, the imaging involves confocal, multi-photon, light sheet, line scan, structured illumination, epifluorescence, or other suitable methods known by one of skill in the art.

In any of the above embodiments, the cleared tissues are more than 75% of their original volume, for example, more than 80% of their original volume, more than 85% of their original volume, more than 90% of their original volume, more than 95% of their original volume, more than 97% of their original volume, more than 98% of their original volume, or more than 99% of their original volume.

In any of the above embodiments, the cleared tissues have an increase in imaging depth of 0.5 times compared to PBS treated tissues. In another embodiment, the cleared tissues have an increase in imaging depth of 1 time compared to PBS treated tissues. In another embodiment, the cleared tissues have an increase in imaging depth of 1.5 times compared to PBS treated tissues. In another embodiment, the cleared tissues have an increase in imaging depth of 2 times compared to PBS treated tissues. In another embodiment, the cleared tissues have an increase in imaging depth of 2.5 times compared to PBS treated tissues.

In any of the above embodiments, the cleared tissues have an imaging depth of more 50 micrometers, for example, more than 100 micrometers, more than 200 micrometers, more than 300 micrometers, more than 400 micrometers, or more than 800 micrometers. In yet another embodiment, the cleared tissues have an imaging depth of more than 1 millimeter, for example, more than 2 millimeters, more than 3 millimeters, more than 4 millimeters, more than 5 millimeters, or more than 6 millimeters. The depths provided herein are examples only and the present invention should not be limited to these embodiments. As optical tools improve, it will be routine for one skill in the art to extend the imaging to greater depths as tissue transparency is not a limiting factor.

As used herein, "tissue characteristics" includes the morphology of the cells which create the tissue, their function and how they interact and communicate, and the health and biochemical status of the tissue at a cellular or subcellular level.

As used herein, "staining" refers to dying the tissue with a color or labeling the tissue.

As used herein, "fixation" or "fixing" refers to a chemical process which preserves the structure of the tissue being treated. As used herein, "original volume" refers to the volume of the tissue after it is removed from the body but before it is placed in a solution.

The antibody used with embodiments of the invention can be any antibody including a full length antibody or an antibody fragment. For example, the antibody can be polyclonal, monoclonal, recombinant, chimeric, or humanized. Furthermore, the antibody can be of any isotype including without limitation IgA, IgD, IgE, IgG, or IgM. Thus, for example, the antibody can be any IgA such as IgA1 or IgA2, or any IgG such as IgG1, IgG2, IgG3, IgG4, or synthetic IgG.

As the antibodies must be able to readily enter the tissues, antibodies that are relatively large, (e.g., IgM) may be difficult to use with some embodiments of the present invention. Antibody penetration may be increased by using microwave irradiation. Further, aptamers and nanobodies, which are smaller than antibodies, may be used to increase penetration. For example, nanobodies may penetrate 2-3 times faster than traditional antibodies.

Antibodies that have been found to be compatible with tissues cleared in accordance with embodiments of the present invention include B220, CD3, CD4, CD8, CD11c, CD25, CD44, CD31, Lyve-1, Ep-Cam, CD11b, MHCII, CD169, GFAP, CD45.1, Sigler F, Tubulin B3, Bcl6, IgD, pStat3, RORgammaT, cytokeratin, influenza A nucleoprotein, and iNOS. Specific clones of antibodies compatible with tissues cleared in accordance with embodiments of the present invention include B220 (clone RA3-6B2), CD3 (clone 17A2), CD4 (clone RM4-5), CD8 (clone 53-6.7), CD11c (clones N418 and HL3), CD25 (clone PC61), CD44 (clone IM7), CD31 (clone 390), Lyve-1 (clone ALY7), Ep-Cam (clone G8.8), CD11b (clone M1/70), MHCII (clone M5/114.15.2), CD169 (clone 3D6.112), GFAP (clone 2E1.E9), CD45.1 (clone 104), Siglec F (clone 1RNM44N), Tubulin B3 (clone TUJ1), Bcl6 (clone IG191E/A8), IgD (clone c11-26), pStat3 (clone pY705), RORgammaT (clone AFKJS-9), cytokeratin (clone C-11), influenza A nucleoprotein, and iNOS (clone CXNFT). The antibodies provided herein are examples and the present invention should not be limited to these embodiments. One of skill in the art will be able to determine, without undue experimentation, that the behavior of other antibodies of comparable class and species origin, and even those of other species, whether intact, truncated, or of distinct chain (i.e., camelid VHH that have only heavy chain combining regions) would be suitable for use with embodiments of the present invention.

Fluorophores that have been found to be compatible with tissues cleared in accordance with an embodiment of the present invention include CFP, GFP, YFP, tdTomato, DsRed, Alexa 405, Brilliant violet 421, pacific blue, eFluor 450, BD Horizon V500, Brilliant violet 510, Dylight 405-LS, Brilliant violet 650, Alexa 488, Alexa 555, Phycoerythrin, Dylight 521-LS, eFlour 570, Alexa 954, eFluor 615, Alexa 633, CF630, Allophycocyanin, Alexa 647, eFluor 660, CF660, Alexa 700, DAPI, Hoescht, Jojo-1, Cyan AF. The fluorophores provided herein are examples only and the present invention should not be limited to these embodiments. One of skill in the art will be able to determine, without undue experimentation, that other fluorophores with similar characteristics would be suitable for use with an embodiment of the present invention.

In any of the above embodiments, the invention can include sequential staining to increase the number of detected targets. Sequential staining is a method that is typically limited to tissue sections only (i.e., it cannot be used on full tissue samples) but it is useful because it allows for high multiplex immunostaining.

In any of the above embodiments, the invention can include RNA fluorescent in situ hybridization ("FISH"). RNA FISH allows for detection of gene transcripts whose products are not readily detected by available antibodies.

In any of the above embodiments, the present invention provides a method of visualizing tissue characteristics comprising fixing a tissue, labeling the tissue, positioning the tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof and (b) at least one non-ionic density gradient medium, imaging the tissue utilizing a microscope or tissue scanning device, and deconvolving image data.

In any of the above embodiments, the present invention provides a method of visualizing tissue characteristics comprising fixing a tissue, labeling the tissue, positioning the tissue in a tissue clearing composition and allowing the tissue clearing composition to permeate the tissue, wherein the tissue clearing composition comprises (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and (b) at least one non-ionic density gradient medium, imaging the tissue utilizing a microscope or tissue scanning device, and segmenting image data utilizing imaging software.

In any of the above embodiments, the present invention provides a kit for clearing tissue comprising a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, and (c) a vessel for containing the tissue. The at least one non-ionic density gradient medium can be pre-mixed with the compound of formula $R^1$—C(X)—$NR^2R^3$ in the kit, or provided in the kit in a separate container, allowing the end user to mix the at least one non-ionic density gradient medium and the compound of formula $R^1$—C(X)—$NR^2R^3$ prior to use.

In any of the embodiments herein "vessel" refers to a structure which can hold tissue in a liquid. The vessel could be, for example, a petri dish, a plastic or glass container of a suitable size, or a microscope slide.

In another embodiment, the present invention provides a kit for clearing tissue comprising a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, (c) a vessel for containing the tissue, and (d) a sealant.

In any of the embodiments herein "sealant" refers to a substance which substantially prevents the composition of the present invention from leaving the vessel. The sealant could be, for example, a greasy, silicone-based or adhesive substance.

In any of the above embodiments, the present invention provides a kit for clearing tissue comprising a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, (c) a vessel for containing the tissue, and (d) stain.

In any of the above embodiments, the present invention provides a kit for clearing tissue comprising a tissue clearing composition comprising (a) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, (b) at least one non-ionic density gradient medium, (c) a vessel for containing the tissue, (d) a sealant, and (e) a stain.

In any of the above embodiments, the term "alkyl" implies a straight-chain or branched alkyl containing, for example, from 1 to 6 carbon atoms, e.g., from 1 to 4 carbon atoms. Examples of alkyl group include methyl, ethyl, n-propyl, isopropyl, n-butyl, sec-butyl, isobutyl, tert-butyl, n-pentyl, isopentyl, n-hexyl, and the like. This definition also applies wherever "alkyl" occurs as part of a group, such as, e.g., fluoro C1-C6 alkyl. The alkyl may be substituted or unsubstituted, as described herein.

In any of the above embodiments, the term "haloalkyl" refers to a halogen selected from fluorine, chlorine, bromine, and iodine appended to an alkyl group as defined above.

In any of the above embodiments, the term "hydroxyalkyl" refers to —OH appended to an alkyl group as defined above.

In any of the above embodiments, the term "amino" refers to —NH$_2$.

In any of the above embodiments, the term "alkylamino" refers to —NH$_2$ appended to an alkyl group as defined above, as, e.g., in —NHCH$_3$.

A salt of a compound is a biologically acceptable salt, which is generally non-toxic, and is exemplified by salts with base or acid addition salts, inclusive of salts with inorganic base such as alkali metal salt (e.g., a sodium salt, a potassium salt), alkaline earth metal salt (e.g., calcium salt, magnesium salt), ammonium salt, salts with organic base such as organic amine salt (e.g., triethylamine salt, diisopropylethylamine salt, pyridine salt, picoline salt, ethanolamine salt, diethanolamine salt, triethanolamine salt, dicyclohexylamine salt, N, N'-dibenzylethylenediamine salt), inorganic acid salt (e.g., hydrochloride, hydrobromide, sulfate, phosphate), organic carboxylic or sulfonic acid salt (e.g., formate, acetate, trifluoroacetate, maleate, tartrate, fumarate, methanesulfonate, benzenesulfonate, toluenesulfonate), salt with basic or acid amino acid (e.g., arginine, aspartic acid, glutamic acid), and the like. In any of the above embodiments, the term "salt" encompasses "pharmaceutically acceptable salt." Lists of suitable pharmaceutical salts are found in, for example, *Remington's Pharmaceutical Sciences*, 18th ed., Mack Publishing Company, Easton, Pa., 1990, p. 1445, and *Journal of Pharmaceutical Science*, 66, 2-19 (1977). For example, they may be a salt of an alkali metal (e.g., sodium or potassium), alkaline earth metal (e.g., calcium), or ammonium of salt.

Salts formed from free carboxyl groups may also be derived from inorganic bases such as, for example, sodium, potassium, ammonium, calcium, or ferric hydroxides, and such organic bases as isopropylamine, trimethylamine, 2-ethylamino ethanol, histidine, procaine, and the like.

It is further understood that the compounds described herein may form solvates, or exist in a substantially uncomplexed form, such as the anhydrous form. Those of skill in the art appreciate that many organic compounds can form complexes with solvents in which they are reacted or from which they are precipitated or crystallized. These complexes are known as "solvates." A solvate is a molecule consisting of a complex made up of solute molecules and solvent molecules resulting from the solution. For example, a complex with water is known as a "hydrate." Solvates as defined herein may be crystalline or non-crystalline, such as amorphous, and may be formed by any suitable method, including, but not limited to reaction, precipitation, or crystallization. Solvates of the compounds, salts, and stereoisomers described herein, including pharmaceutically acceptable solvates, are within the scope of the invention.

It will also be appreciated by those of skill in the art that many organic compounds can exist in more than one crystalline form (polymorphic forms). For example, crystalline form may vary from solvate to solvate. Thus, all crystalline forms of the compounds, salts, solvates, and stereoisomers described herein are within the scope of the present invention. Pharmaceutically acceptable solvates include hydrates, alcoholates such as methanolates and ethanolates, acetonitrilates and the like.

A compound can have stereoisomers based on asymmetric carbon atoms and double bonds, such as optical isomers, geometric isomers, and the like, all of which and mixtures thereof are also encompassed in the present invention.

The compounds or salts of a compound of formula R$^1$—C(X)—NR$^2$R$^3$, wherein R$^1$ is alkyl, haloalkyl, hydroxyalkyl, amino, or alkylamino, X is O or S, and R$^2$ and R$^3$ are independently H, alkyl, or hydroxyalkyl, may be prepared by any suitable synthetic methodology.

A composition or method of any of the above embodiments has the advantage of being inexpensive and easy to use. Further, a composition of any of the above embodiments has a different refractive index compared to other tissue clearing compositions known by one of ordinary skill in the art. In addition, a composition or method of any of the above embodiments has one or more of the following advantages: (1) preserving cellular morphology and protein fluorescence (e.g., GFP, YFP, RFP, CFP, DsRed, tdTomato) and is compatible with antibody-based immunolabeling (i.e., enables direct immunostaining versus indirect staining, such as, use of an antibody sandwich); (2) permits quantitative analysis of distinct, highly intermixed cell populations in treated intact tissues via 3D histo-cytometry because of its enhanced signal quality and capacity for extensive probe multiplexing (i.e., compatible with at least 29 fluorophores); (3) enables quantitative analysis of the composition and tissue distribution of multiple cell populations in lymphoid tissues with densely packed cells; (4) provides a comprehensive strategy for volumetric quantitative imaging and analysis that bridges the gap between conventional section imaging and disassociation-based techniques; and (5) requires the use of a relatively small number of antibodies because an isolated tissue or tissue fragment can be stained (compared to having to use enough antibodies to infuse into the tissues of the entire animal).

Although a composition of any of the above embodiments can contain additional components, it is free or substantially free from compounds such as: a hydrogel (a network of polymer chains that are water-insoluble); a photoinitiator (e.g., 2,2'-azobis[2-(2-imidazolin-2-yl)propane]dihydrochloride); trichloro ethanol, chloroacetic acid, or derivatives or analogs thereof; 3-(N,N-dimethylmyristylammonio)propanesulfonate, dimethyl sulfoxide, diatrizoate acid, ethylenediaminetetraacetic acid, glucamine, nicotinamide adenine dinucleotide phosphate, sodium diatrizoate, or derivatives of polyoxyalkalene; or a compound of formulas I or II:

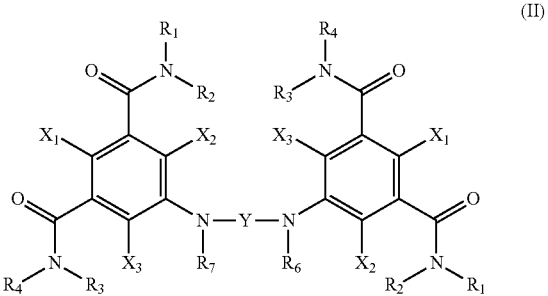

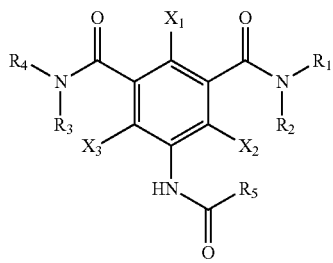

(I)

wherein $R_1$, $R_2$, $R_3$, and $R_4$ are independently H, or $C_{1-6}$ alkyl substituted with at least two —OH; $R_5$ is $C_{1-3}$ alkyl substituted with at least one —OH or —CH$_2$OCH$_3$; $R_6$ and $R_7$ are independently acetyl or $C_{1-3}$ alkyl; $X_1$, $X_2$, and $X_3$ are independently a halogen selected from the group consisting of Cl, Br, and I; Y is $C_{1-3}$ alkyl substituted with at least one —OH or

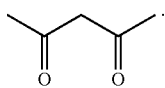

As used herein, "substantially free" means less than 10% of any one of the compounds. For example, less than 9%, 8%, 7%, 6%, 5%, 4%, 3%, 2%, or 1% of any one of the compounds.

For example, a composition of any of the above embodiments is advantageous over a composition that is not substantially free of a hydrogel because the composition of any of the above embodiments does not require the use of a pump system (e.g., complex eletrophoretic device and sodium dodecyl sulfate) to remove lipid and reagents from the treated tissues (which requires substantial time and adds complexity to the use of the compositions). The composition of any of the above embodiments is therefore simpler and easier to use as it requires less equipment.

Although a method of any of the above embodiments can contain additional steps, it does not involve the step of treating the tissue with nitrogen gas (e.g., placing the tissue in a substantially closed chamber and introducing nitrogen into the chamber containing the tissue).

The following includes certain aspects of the invention.

1. A tissue clearing composition comprising:
   (a) a compound of formula $R^1$—C(X)—NR$^2$R$^3$,
   wherein $R^1$ is alkyl, haloalkyl, hydroxyalkyl, amino, or alkylamino,
   X is O or S, and
   $R^2$ and $R^3$ are independently H, alkyl, or hydroxyalkyl, a salt thereof, or a combination thereof; and
   (b) at least one non-ionic density gradient medium.

2. The composition of aspect 1, comprising, as component (a), N-methylacetamide, N,N-dimethylacetamide, N-ethylacetamide, N-(hydroxymethyl)acetamide, 2-hydroxy-N-methylacetamide, 2-chloro-N-(hydroxymethyl)acetamide, urea, thiourea, N,N'-dimethylurea, a salt thereof, or a combination thereof.

3. The composition of aspect 1 or 2, comprising, as component (a), N-methylacetamide, N,N-dimethylacetamide, N-ethylacetamide, a salt thereof, or a combination thereof.

4. The composition of any one of aspects 1-3, comprising, as component (a), N-methylacetamide or a salt thereof.

5. The composition of any one of aspects 1-4, wherein the non-ionic density gradient medium contains 5-(N-2,3-dihydroxypropylacetamido)-2,4,6-triiodo-N,N'-bis(2,3-dihydroxypropyl)isophthalamide, fructose, or diatrizoic acid.

6. The composition of any one of aspects 1-5, wherein the non-ionic density gradient medium contains 5-(N-2,3-dihydroxypropylacetamido)-2,4,6-triiodo-N,N'-bis(2,3-dihydroxypropyl)isophthalamide.

7. The composition of any one of aspects 1-6, comprising from about 1 to about 40% volume/volume of a compound of formula $R^1$—C(X)—NR$^2$R$^3$,
wherein $R^1$ is alkyl, haloalkyl, hydroxyalkyl, amino, or alkylamino,
X is O or S, and $R^2$ and $R^3$ are independently H, alkyl, or hydroxyalkyl, a salt thereof, or a combination thereof.

8. The composition of any one of aspects 1-7, further comprising a buffer.

9. The composition of aspect 8, wherein the buffer is a phosphate-buffered saline.

10. The composition of aspect 8 or 9, wherein the buffer contains a saponin.

11. The composition of any one of aspects 8-10, wherein the buffer contains ammonium ions, chloride ions, potassium ions, or a combination thereof.

12. The composition of any one of aspects 1-11, further comprising a non-ionic surfactant.

13. The composition of aspect 12, wherein the non-ionic surfactant has a polyethylene oxide side chain and an aromatic hydrocarbon group.

14. The composition of any one of aspects 1-13, further comprising 1-thioglycerol.

15. The composition of any one of aspects 1-14, further comprising heparin.

16. The composition of any one of aspects 1-15, further comprising streptokinase.

17. A tissue clearing composition comprising:
   (a) from about 1 to about 50% volume/volume of a compound of formula $R^1$—C(X)—NR$^2$R$^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof;
   (b) from about 1 to about 95% volume/volume of at least one non-ionic density gradient medium; and
   (c) from about 25 to about 60% volume/volume of a buffer.

18. The composition of aspect 17, further comprising from about 0.1 to about 0.5% volume/volume of a non-ionic surfactant.

19. A method for clearing tissue comprising
   positioning a tissue into a tissue clearing composition and allowing the tissue clearing composition to permeate the tissue, wherein the tissue clearing composition comprises:
   (a) a compound of formula $R^1$—C(X)—NR$^2$R$^3$,
   wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and
   (b) at least one non-ionic density gradient medium.

20. The method of aspect 19, further comprising fixing the tissue prior to positioning the tissue in the tissue clearing composition.

21. The method of aspect 20, further comprising positioning the tissue in acetone after the tissue is fixed.

22. The method of aspect 19, further comprising staining the tissue prior to positioning the tissue in the tissue clearing composition.

23. The method of any one of aspects 19-22, wherein the tissue is positioned in the tissue clearing composition for from about 1 to about 48 hours.

24. The method of any one of aspects 19-23, wherein the tissue clearing composition is at a temperature of from about 10 to about 37 degrees Celsius.

25. The method of any one of aspects 19-24, wherein the tissue is a mammalian tissue.

26. A method for visualizing tissue characteristics comprising:
(a) fixing a tissue;
(b) labeling the tissue;
(c) positioning the tissue in a tissue clearing composition and allowing the tissue clearing composition to permeate the tissue,
wherein the tissue clearing composition comprises:
(1) a compound of formula $R^1$—C(X)—$NR^2R^3$,
wherein $R^1$ is alkyl, haloalkyl, hydroxyalkyl, amino, or alkylamino, X is O or S, and
$R^2$ and $R^3$ are independently H, alkyl, or hydroxyalkyl, a salt thereof, or a combination thereof and (2) at least one non-ionic density gradient medium; and
(d) imaging the tissue by utilizing a microscope or tissue scanning device.

27. The method of aspect 26, further comprising deconvolving image data.

28. The method of aspect 26 or 27, further comprising segmenting image data by utilizing imaging software.

29. A kit for clearing tissue comprising:
(a) a tissue clearing composition comprising a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof;
(b) at least one non-ionic density gradient medium; and
(c) a vessel for containing the tissue.

30. The kit of aspect 29, further comprising a sealant.

31. The kit of aspect 29 or 30, further comprising a stain.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

This example demonstrates the improved clearing of tissues, including preservation of cellular morphology, reporter fluorescence and epitope labeling, when tissues are treated in accordance with embodiments of the invention. In this example, mouse tissues were cleared, stained, and imaged in accordance with embodiments of the invention. The specific details of this experiment are as follows.

Mice: CD11c-YFP (B6.Cg-Tg(Itgax-Venus)1Mnz/J), actin-DsRed (B6.Cg-Tg(CAG-DsRed*MST)1Nagy), Cxcl12-DsRed (Cxcl12tm2.1Sjm/J), Cx3cr1-GFP (B6.129P-Cx3cr1 tm1Litt/J) and Histone GFP-tagged reporters (B6.Cg-Tg(HIST1H2BB/EGFP)1Pa) were obtained from Jackson Laboratories. Fluorescent Confetti animals were generated by crossing B6.129P2-Gt(ROSA) 26Sortm1(CAG-Brainbow2.1)Cle/J×B6.Cg-Tg(UBC-cre/ERT2)1Ejb/2J Jackson Laboratories). Mice heterozygous for both transgenes were injected intraperitoneally with tamoxifen 100 micrograms per gram of body weight in peanut oil (Sigma Aldrich) for five consecutive days, with tissues collected on the fifth day for processing. All mice were maintained in specific-pathogen-free conditions at an Association for Assessment and Accreditation of Laboratory Animal Care-accredited animal facility at the NIAID. All procedures were approved by the NIAID Animal Care and Use Committee (National Institutes of Health, Bethesda, Md.).

Tissue isolation and fixation: Lymph nodes were harvested and fixed with 0.05 M phosphate buffer containing 0.1 M L-lysine (pH 7.4), 2 milligrams per milliliter $NaIO_4$ and 1 percent paraformaldehyde overnight at 4 degrees Celsius. To minimize contribution of erythrocytes when conducting non-lymph node tissue imaging, cardiac perfusion was performed with 1× phosphate buffered saline ("PBS") followed by 4 percent paraformaldehyde in PBS. Individual organs were then isolated and further fixed with 0.05 M phosphate buffer containing 0.1 M L-lysine (pH 7.4), 2 milligrams per milliliter $NaIO_4$ and 1 percent paraformaldehyde overnight at 4 degrees Celsius. For brain tissues, BD Fixation buffer (available from BD Biosciences) was used for initial perfusion fixation, with the organ next cut via Vibratome® tissue sectioning device (Vibratome is a registered trademark of Leica Biosystems) into individual 1 to 2 millimeter slices, which were further fixed with the BD Cytofix/Cytoperm buffer (1:4 dilution of paraformaldehyde to 1×PBS, available from BD Biosciences) at 4 degrees Celsius overnight. For studies comparing tissue sections before and after treatment with the tissue clearing composition, fixed tissues were embedded in 2 percent agarose and cut into 200 micrometer sections with a Vibratome®.

Whole Mount Staining: Fixed tissues were incubated for at least 8 hours in a blocking buffer containing 1 percent normal mouse serum, 1 percent bovine serum albumin and 0.3 percent Triton™ X-100. For brain slices, BD Permeabilization buffer (available from BD Biosciences), supplemented with 1 percent normal mouse serum and bovine serum albumin, was used to block and permeabilize tissues for up to 3 days at 37 degrees Celsius. Tissues were then incubated with directly conjugated antibodies, diluted 1:100 in the blocking buffer, for 3 days at 24 or 37 degrees Celsius on a shaker, with higher temperatures allowing for more rapid tissue staining. Stained samples were washed with PBS containing 0.2 percent Triton™ X-100 for 12 to 24 hours at 37 degrees Celsius. Brain tissues were then washed with the BD Permeabilization buffer.

Tissue clearing: Stock 40 percent N-methylacetamide in PBS solution was prepared and used to dissolve 5-(N-2,3-dihydroxypropylacetamido)-2,4,6-triiodo-N,N'-bis(2,3-dihydroxypropyl)isophthalamide (e.g., Histodenz™, available from Sigma Aldrich) to 90 percent (weight to volume) concentration inside a chemical fume hood, with the mixture incubated at 37 degrees Celsius to expedite dissolution time. Triton™ X-100 (0.1 percent volume/volume) and 1-thioglycerol (0.5 percent volume/volume) were added to the clearing solution. The final refractive index of the tissue clearing composition was 1.49. Stained and washed tissues were placed in the tissue clearing composition inside a chemical fume hood and incubated at room temperature on a rotor for 12 to 72 hours. Total incubation time depended on tissue size, with the clearing medium replaced once during the incubation for larger tissue samples.

Imaging: Stained and cleared tissues were embedded in fresh tissue clearing composition within a vacuum grease or silicone gel spacer either on a microscope slide or in a glass-bottom 35 millimeter dish and tightly covered with a cover glass. Confocal imaging was performed on an inverted SP8 microscope (Leica Microsystems) using either a 20×0.75 NA 670 micrometer working distance or a 40×1.3 NA 240 micrometer working distance objective. 512×512 or 1024×1024 voxel density at 1 to 1.5× optical zoom was used, with the voxel size ranging from 0.3 to 0.6 micrometer in the lateral and 0.5 to 1.0 micrometer in the axial directions.

Cell Segmentation Pipeline: Collected images were corrected for fluorophore spillover using the Leica Channel Dye Separation Module, deconvolved via Huygen's Essential software (Scientific Volume Imaging) and imported into Imaris (Bitplane Scientific Software). Images were next converted into 8-bit format and corrected for z attenuation using the Attenuation Correction extension in Imaris. The Linear Stretch plugin was used to normalize channel histograms. All channels representing membrane surface stains were next summed into a new Sum Channel using Channel Arithmetics, with the resultant channel then exported into FIJI (ImageJ) for further processing. The Sum Channel was inverted to create an Inverse Sum Channel. Improved contrast and cell separation was observed by further subtracting the Sum Channel from the Inverse Sum Channel, which was then used for further processing. Next, the Inverse Sum Channel was used to create two dimensional skeletons in the XY, XZ and YZ planes. For this, the Inverse Sum Channel was rotated 90 degrees along the X and Y axes using the Transform-J FIJI plugin. The images were then binarized using the Median Auto Local Thresholding tool and despeckled to remove noise. The images were next processed via the 2D Skeleton plugin, inverted to create a white skeleton signal and rotated back to the original views using the Transform-J function. The XY, XZ and YZ skeletons were next subtracted from the Inverse Sum Channel to improve cellular separation in three dimensional space. This new calculated channel was then imported back into the original image in Imaris. Here, the Gamma Correction plugin was used on the calculated channel to enhance signal variation from the center to the edges of individual cells. Finally, the Cell Creation module in Imaris was used to segment individual cell objects within the image, with the statistics for all segmented cells exported as individual comma separated value (CSV) files. Mean Channel Intensity, Volume, Sphericity, Position, as well as Object Identifier statistics were compiled into a single CSV matrix file and imported into Flowjo software (Treestar Inc.) for final hierarchical gating analysis.

Statistical Analysis: The statistical significance of differences in mean values was analyzed by a two-tailed Student's t test. Paired t tests were conducted for comparison of the same tissue samples before and after clearing treatment. * signifies $p<0.0001$,  signifies 669 $p<0.005$, and * signifies $p<0.05$.

Figure 2:
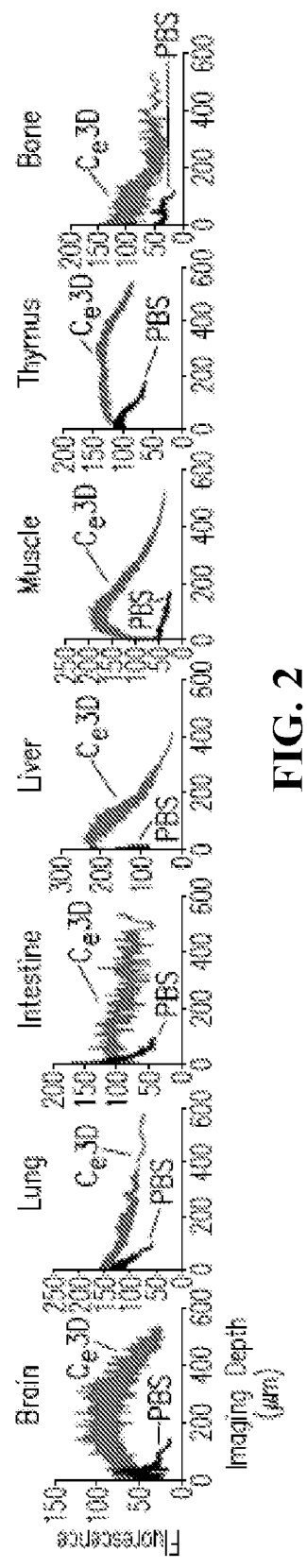
FIG. 2 depicts graphs showing the average readable imaging depth of cellular fluorescence for CD11c-YFP expressing cells before (PBS, black lines) and after treatment (Ce3D, grey lines) in brain, lung, intestine, liver, muscle, thymus, and bone.
Figure 3:
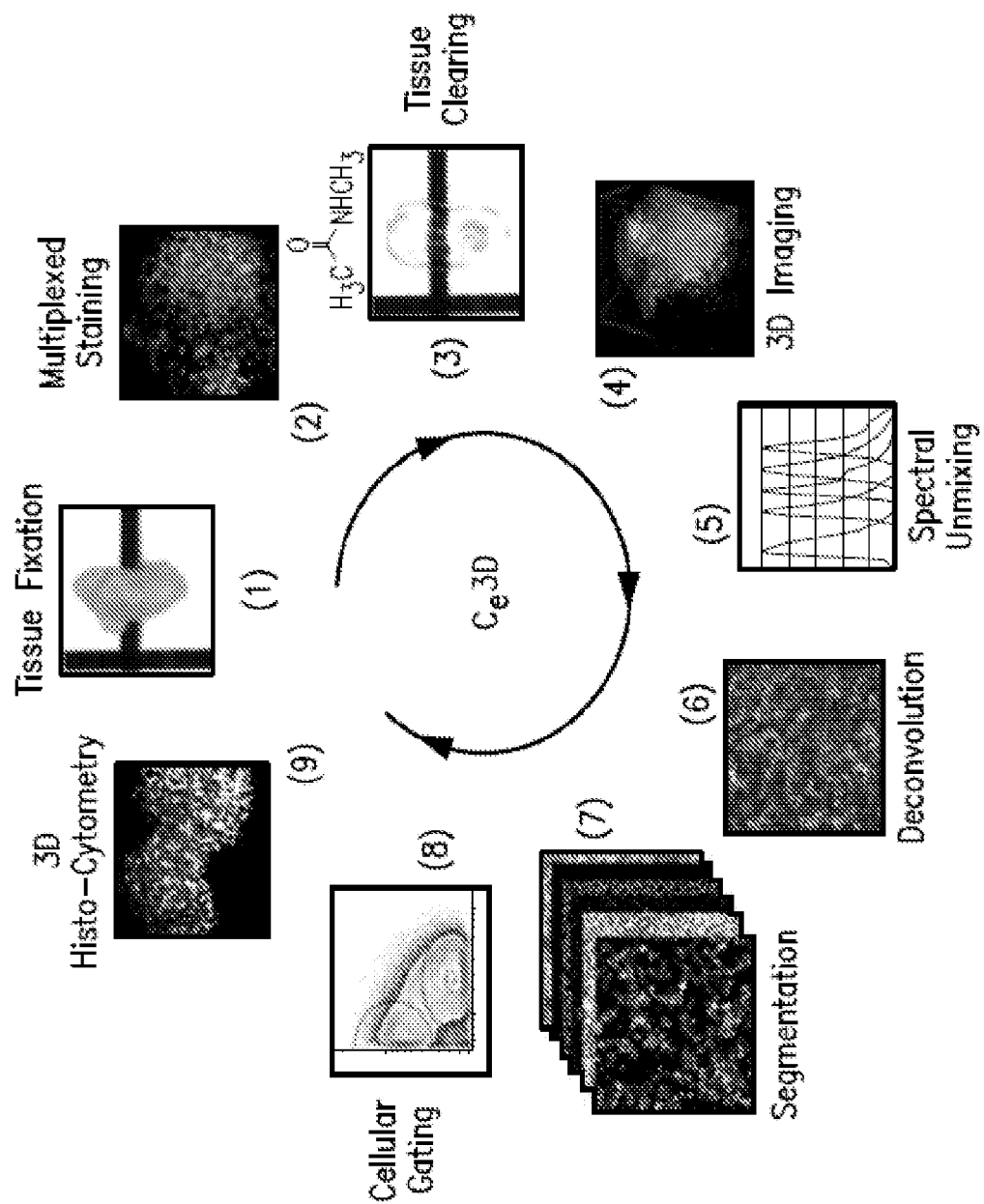
FIG. 3 shows the pipeline for tissue clearing, imaging and quantitative Histo-cytometry. The tissues are (1) fixed, (2) stained with fluorophore-conjugated antibodies, (3) cleared in accordance with an embodiment of the present invention, and (4) imaged. Optional (5) spectral unmixing is performed to compensate for fluorophore spillover into neighboring detectors if necessary. Deconvolution (6) is performed to improve image quality and quantitative accuracy. Images are then (7) segmented into individual cell objects, with the objects' statistics exported into graphing software for (8) phenotypical gating of cell populations and (9) quantitative image Histo-cytometry.

It was surprising to see the clarity of the tissues. As seen in FIG. 1, the tissues are completely transparent and text that is below the tissues is legible through the tissue. As seen in FIG. 2, the tissues cleared with the composition of the present invention allowed for greater imaging depth. For example, the brain tissue had much more intense fluorescence at a greater depth. The PBS tissue had an imaging depth of less than 200 micrometers while the cleared tissue had fluorescence at a depth of greater than 500 micrometers. Similarly, the lung and intestine tissues went from a depth of about 100 micrometers to about 600 micrometers after clearing. The liver went from a depth of less than 50 micrometers to greater than 400 micrometers. The muscle, thymus, and bone tissues went from less than 200 micrometers to almost 600 micrometers in imaging depth.

Adding a non-ionic surfactant improved the clarity of tissues but was not necessary for all tissues. It was also discovered that using a lysing buffer containing heparin or streptokinase improved clarity of tissues with high erythrocyte composition.

Figure 4:
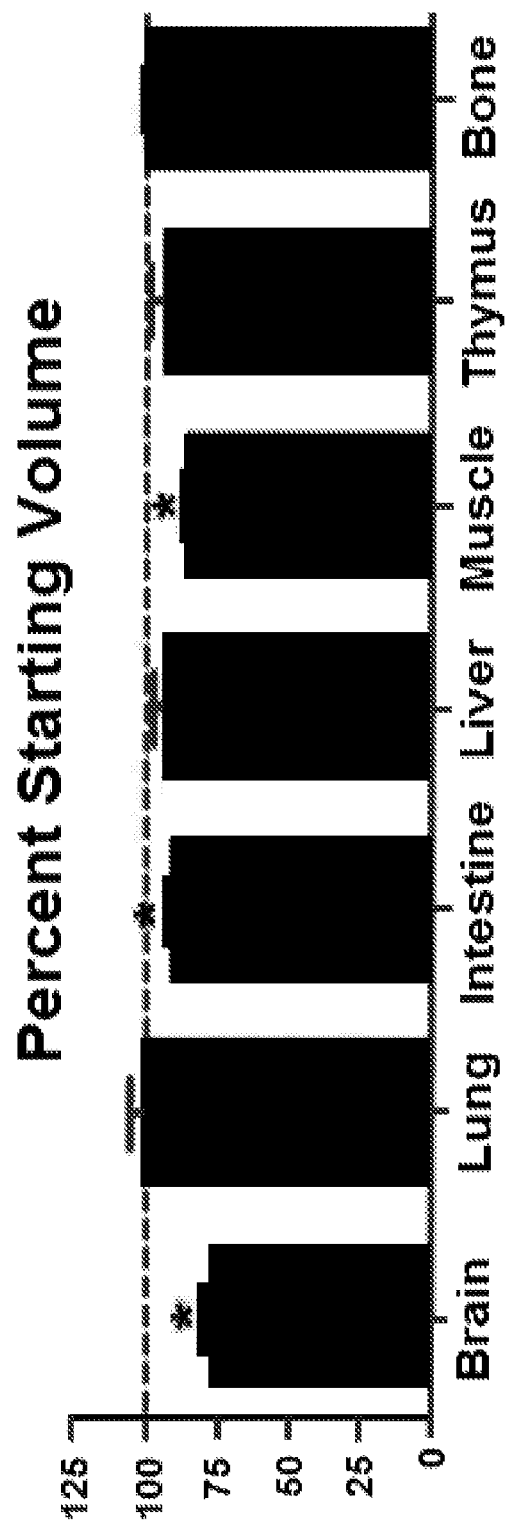
FIG. 4 shows that tissues cleared in accordance with embodiments of the present invention (specifically, brain, lung, intestine, liver, muscle, thymus, and bone) maintain close to their original volumes (>75% to 100% of their original volumes).
Figure 5:
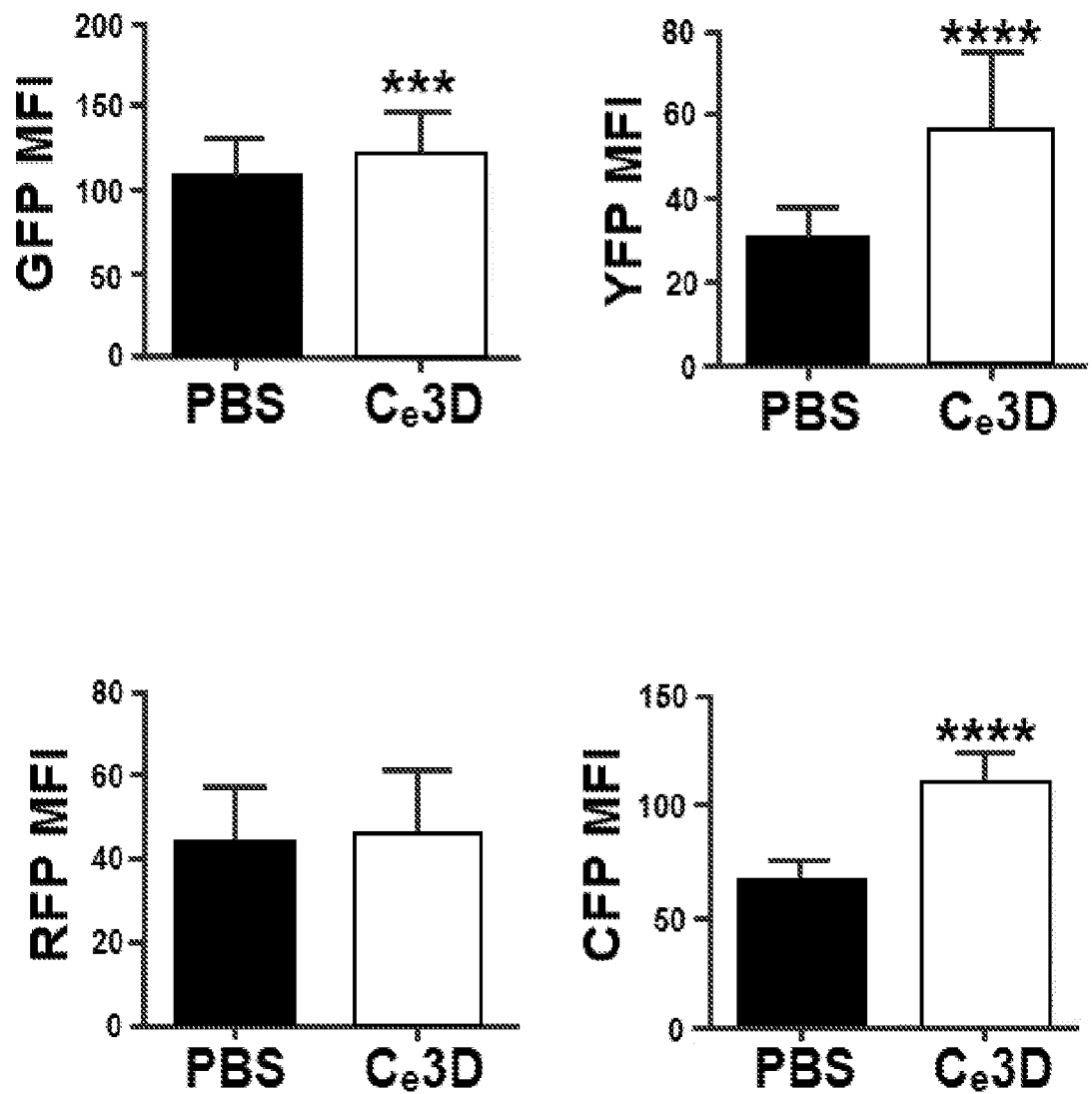
FIG. 5 shows the mean quantification of reporter fluorescence intensity (MFI) for Confetti reporter mouse tissues before (PBS) and after they were cleared in accordance with an embodiment of the invention ($C_e3D$). The cells in these tissues were marked by expression of GFP, YFP, RFP, and CFP before quantification.
Figure 6:
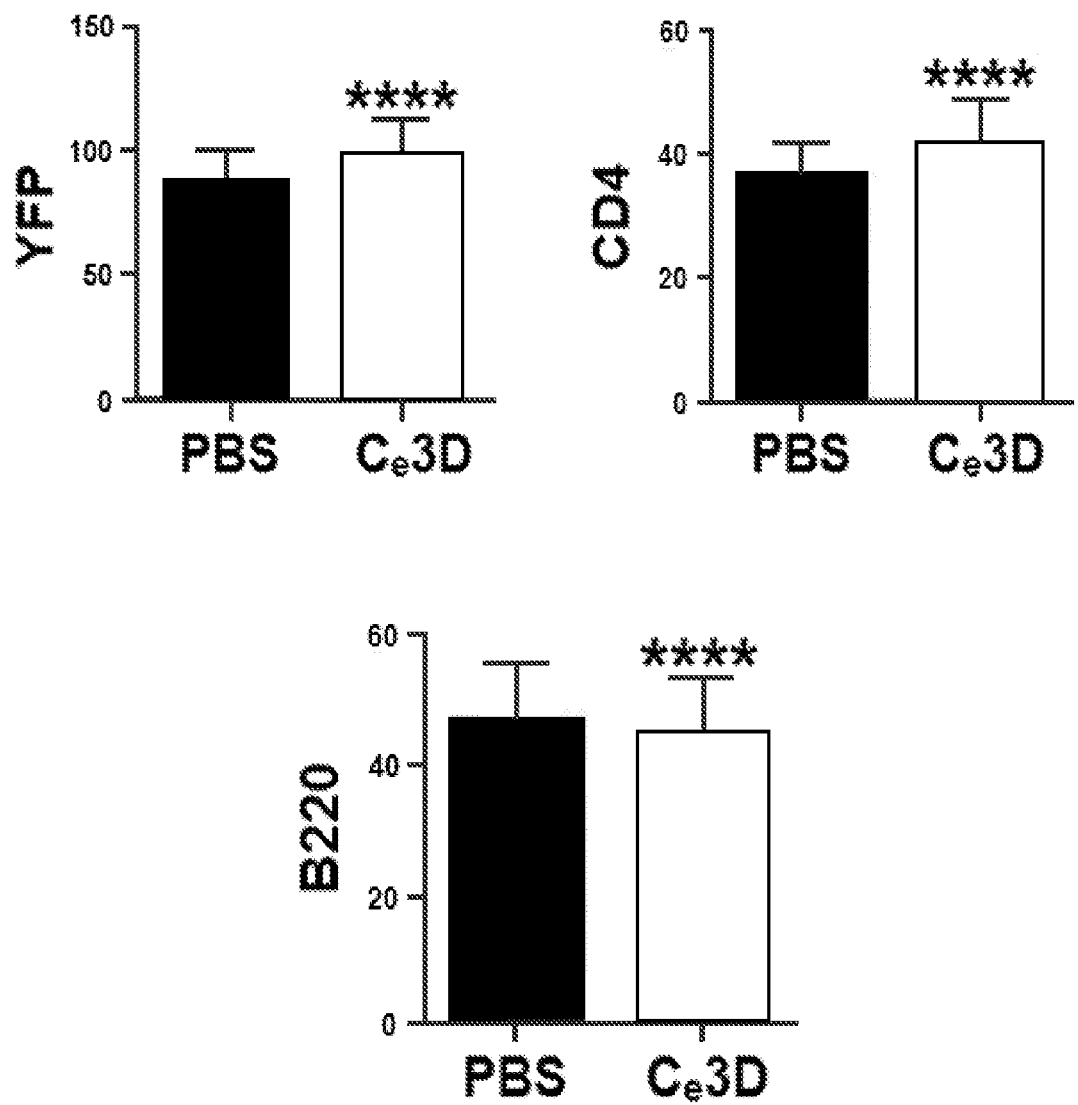
FIG. 6 shows the mean quantification of reporter fluorescence intensity (MFI) for CD11c-YFP murine lymph node sections before (PBS) and after they were cleared in accordance with an embodiment of the invention ($C_e3$ D). The cells in these tissues were marked by expression of YFP, CD4, and B220 before quantification.

It was also found that the tissues maintained close to their original volumes after the clearing (see FIG. 4). This was unexpected because prior art methods result in distortion and volume loss. When the tissues were cleared in this experiment, the loss was less than 25% of their volume. Lung and bone tissues lost less than 5% of their volume while intestine, liver, muscle and thymus lost less than 15% of the volume. Brain tissue retained more than 75% of its original volume (loss less than 25% of the original volume).

Figure 7:
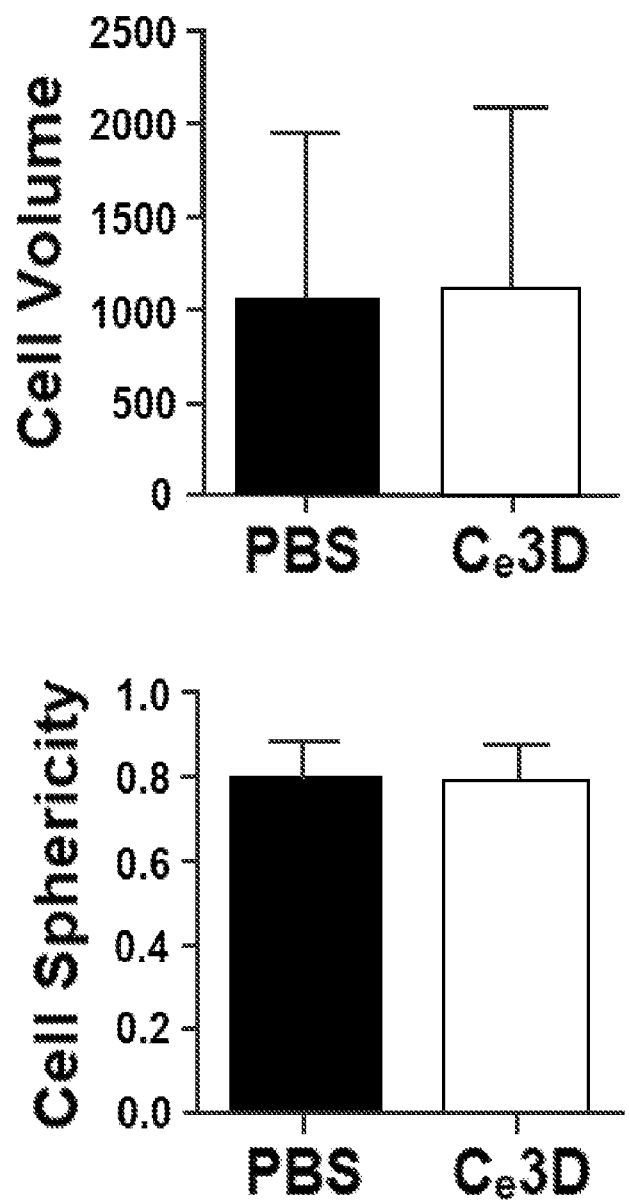
FIG. 7 shows the mean quantification of the cell volume and cellular complexity, as measured by object sphericity, of CD11c-YFP murine dendritic cells in lymph nodes before (PBS) or after they were cleared in accordance with an embodiment of the invention ($C_e3D$).
Figure 8:
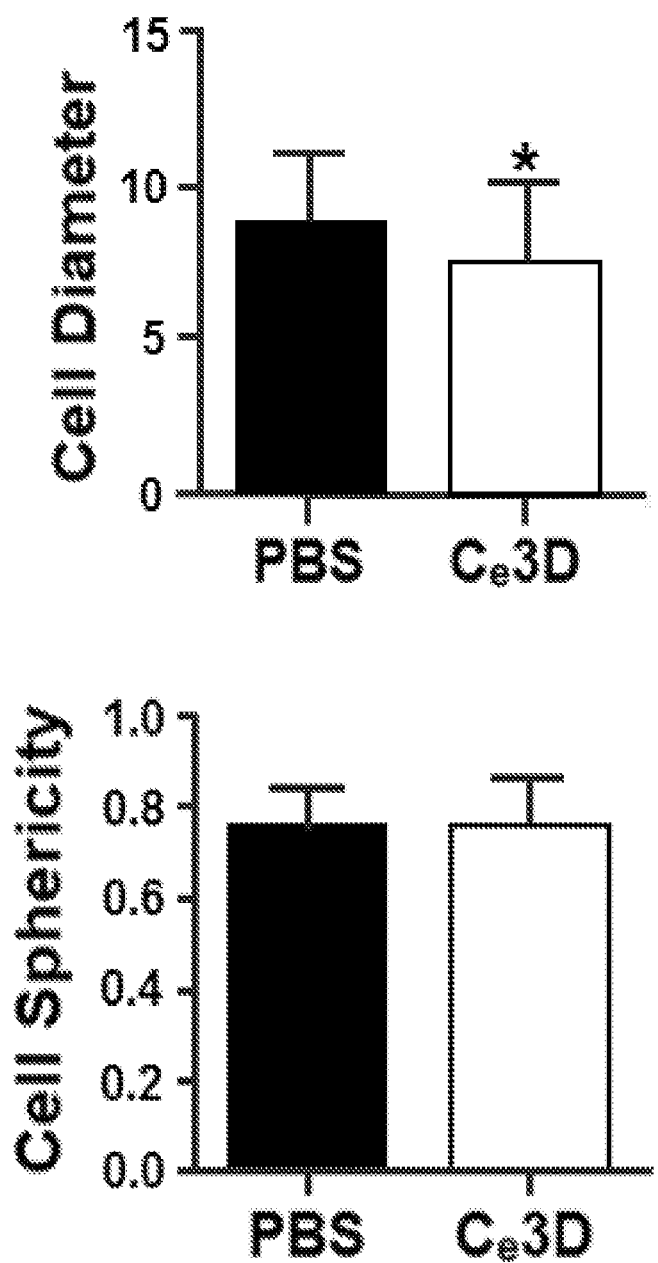
FIG. 8 shows the mean quantification of average cell volume and cellular complexity, as measured by object sphericity, of Confetti mouse brain cells before (PBS) or after they were cleared in accordance with an embodiment of the invention ($C_e3$ D).

Scans of CD11c-YFP expressing dendritic cells in lymph nodes and Confetti reporter brain tissues showed that cell volume and cellular complexity, as measured by object sphericity, was preserved during processing (see FIGS. 7 and 8).

It was also unexpectedly found that even though the tissues were transparent, the structures of the proteins within the cells were still preserved. For example, the cells within microvilli of intestines stained sharply allowing for differentiation between lymphatic endothelial and mucosal epithelial cells. Specifically, the spatial relationships between mucosal epithelium (Ep-CAM+), T cells (CD3+), and lymphatics (Lyve-1+, center of villi) were clearly visible.

Further, scans of 1 mm brain slices stained with an anti-GFAP antibody showed greatly improved tissue morphology and quality of reporter-based fluorescence, specifically astrocyte cellular projections. Scans of Cx3cr1-GFP brain tissues stained with an anti-GFAP antibody showed individual branching patterns for ramified microglial cells. Scans of CD11c-YFP liver tissues that also display autofluorescent signal (cyan) clearly showed the relationships between Kupffer cells and liver sinusoids.

Example 2

This example demonstrates an improved method of clearing of lipid-rich tissues, including preservation of cellular morphology, reporter fluorescence and epitope labeling, when tissues are treated in accordance with an embodiment of the invention.

In this example, mouse brain tissue was cleared, stained, and imaged in accordance with Example 1 except as indicated for the following: (1) 1×BD Perm/Wash™ buffer (available from BD Biosciences) was used instead of BD Peimeabilization buffer for tissue washing; and (2) 1% BSA and normal mouse serum in 1×BD Perm/Wash™ was used as the blocking and antibody dilution buffer. BD Perm/Wash™ is a saponin containing buffer which also includes sodium azide and Fetal Bovine Serum.

This method provides improved clearing of tissue that are lipid-rich, such as brain tissue, by using a commercially available (e.g., one available from BD Biosciences) saponin-based surfactant.

Example 3

This example demonstrates the improved clearing of fat-rich tissues, including preservation of cellular morphology, reporter fluorescence and epitope labeling, when tissues are treated in accordance with an embodiment of the invention.

In this example, mouse mammary gland tissue was cleared, stained, and imaged in accordance with Example 1 except as indicated below.

After fixation, samples were incubated at room temperature for one hour each in 50%, 80%, 95%, 100% of acetone (acetone was diluted in water). The incubation 100% acetone can be extended to 1 to 3 days (at room temperature) depending on the size of sample. Then the samples were incubated in 95%, 80%, 50% of acetone for 1 hour at room temperature, and finally in PBS.

The 3D structure of ducts of the mouse mammary glands were visualized by $C_e3$ D clearing. The directly conjugated antibody (Alexa Fluor 647) for E-cadherin was used to stain ducts, dendritic cells were visualized by endogenous expression of YFP in the CD11c-YFP mouse, and blood vessels were stained using auto fluorescence. The images produced by the clearing technique clearly showed the precise location of the ducts in the mammary tissue.

Example 4

This example demonstrates an improved method for preserving the coloration (i.e., reducing discoloration) of the tissues. In this example, tissues were cleared, stained, and imaged in accordance with Example 1 except as indicated below.

After immunostaining, the tissues were incubated in 20%, 40%, 60%, 80%, and 100% of the tissue clearing composition of Example 1 (v/v). The dilutions of the tissue clearing composition were made by mixing the tissue clearing composition of Example 1 with PBS. For example, 1 ml of 20% of the tissue clearing composition of Example 1 was made from 800 ul PBS and 200 ul 100% of the tissue clearing composition of Example 1, plus 1% TritonX-100 and 5% 1-thioglycerol (v/v). For the mouse lymph node tissues, the incubation time in 20%, 40%, 60%, 80%, 100% of the tissue clearing composition of Example 1 was 1 hour, 1 hour, 2 hours, 4-6 hours, and overnight (respectively). All the incubations were performed at room temperature.

The tissues treated in accordance with this embodiment of the invention exhibited decreased discoloration.

Example 5

This example demonstrates that an embodiment of the present invention provides improved clearing and fluorescence compared to other tissue clearing methods.

CD11c-YFP expressing lymph nodes were cleared in accordance with embodiments of the present invention, and compared to tissues subjected to the CUBIC, DISCO, and CLARITY clearing methods, and PBS alone treatment. Tissues were stained with B220, CD8, CD11b, and CD4, and also expressed the reporter YFP. With PBS treatment, all stains showed some illumination. For CUBIC, there was very little B220, CD8, or CD4 staining, no CD11b staining, and some YFP staining (but less than PBS). For DISCO, there was some CD8, CD11b, and CD4 staining but no B220 or YFP staining. For CLARITY, there was good B220 staining, some CD8 and YFP staining, and no detectable CD11b or CD4 staining. When tissues were cleared in accordance with embodiments of the present invention, all of the stains showed good illumination. The CD11b stained about the level of PBS, but all other stains showed much more illumination than the other methods.

Example 6

This example demonstrates some of the unexpected properties of the compositions and methods in accordance with an embodiment of the invention.

Many compounds were tested to determine if the compounds would be effective at clearing tissues when combined with a density gradient medium, such as 5-(N-2,3-dihydroxypropylacetamido)-2,4,6-triiodo-N,N'-bis(2,3-dihydroxypropyl)isophthalamide, in accordance with an embodiment of the present invention. The compounds were also tested to determine if they were compatible with immunohistochemistry ("IHC") (i.e., if the receptor sites in the cells for staining would be negatively impacted by the compounds). The results are below in Table 1 with more "+"s being desirable. As seen in row 2 of Table 1 below, N-methylacetamide was highly compatible with IHC and provided excellent tissue transparency. It achieved a level 5 ("+++++") in both categories.

TABLE 1

| Tested Clearing Reagents | Tissue Transparency | Compatibility with IHC |
|---|---|---|
| N-Methylacetamide | +++++ | ++++++ |
| N-(Hydroxymethyl)acetamide | +++ | +++ |
| N,N-Diethyl-2-hydroxyacetamide | +++ | +++ |
| 2-Hydroxy-N-methylacetamide | +++ | +++ |
| Glycolamide | ++ | +++++ |
| N-Methoxy-N-methylacetamide | +++ | +++ |
| N-(2-Methoxyphenyl)acetamide | + | ++++ |
| N-(Trimethylsilyl)acetamide | + | +++ |
| 2-Chloro-N-(hydroxymethyl)acetamide | +++++ | + |
| 2-Amino-N-methylacetamide | + | +++ |
| 2-Amino-N,N-dimethylacetamide | + | +++ |
| 2-Methylpentanal | water insoluble | N/A |
| Acetamide | + | +++++ |
| Formamide | ++++++ | + |
| N-Methylformamide | ++++++ | + |
| N,N-Dimethylformamide | dissolves plastic | N/A |
| N,N-Dimethylacetamide | +++++ | +++++ |
| (±)-3-Amino-1,2-propanediol | +++++ | + |
| 3-Methylamino-1,2-propanediol | +++++ | + |
| Serinol | ++++ | + |
| 3-Methylamino-1-propanol | ++++ | + |
| 1-Dimethylamino-2-propanol | ++++ | + |
| 3-Dimethylamino-1-propanol | +++++ | + |
| Bis(2-hydroxypropyl)amine | +++++ | + |
| 2-Dimethylamino-2-methylpropanol | +++++ | ++ |
| Urea | +++ | +++ |
| Thiourea | +++ | +++ |
| N-Ethylacetamide | ++++ | ++++++ |
| 1,1-Dimethylurea | ++ | ++ |
| N,N'-Dimethylurea | ++++ | +++ |
| 1,3-Diethylurea | ++ | ++ |
| Tetramethylurea | +++ | ++ |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Also, everywhere "comprising" (or its equivalent) is recited, the "comprising"

is considered to incorporate "consisting essentially of" and "consisting of." Thus, an embodiment "comprising" (an) element(s) supports embodiments "consisting essentially of" and "consisting of" the recited element(s). Everywhere "consisting essentially of" is recited is considered to incorporate "consisting of." Thus, an embodiment "consisting essentially of" (an) element(s) supports embodiments "consisting of" the recited element(s). Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tissue clearing composition comprising:
    (a) a compound of formula $R^1$—C(X)—$NR^2R^3$,
    wherein $R^1$ is alkyl, haloalkyl, hydroxyalkyl, amino, or alkylamino,
    X is O or S, and
    $R^2$ and $R^3$ are independently H, alkyl, or hydroxyalkyl,
    a salt thereof, or a combination thereof; and
    (b) at least one non-ionic density gradient medium containing 5-(N-2,3-dihydroxypropylacetamido)-2,4,6-triiodo-N,N'-bis(2,3-dihydroxypropyl)isophthalamide, fructose, or diatrizoic acid.

2. The composition of claim 1, comprising, as component (a), N-methyl acetamide, N,N-dimethylacetamide, N-ethylacetamide, N-(hydroxymethyl)acetamide, 2-hydroxy-N-methylacetamide, 2-chloro-N-(hydroxymethyl)acetamide, urea, thiourea, N,N'-dimethylurea, a salt thereof, or a combination thereof.

3. The composition of claim 1, comprising, as component (a), N-methylacetamide, N,N-dimethylacetamide, N-ethylacetamide, a salt thereof, or a combination thereof.

4. The composition of claim 1, comprising, as component (a), N-methylacetamide or a salt thereof.

5. The composition of claim 1, wherein the non-ionic density gradient medium contains 5-(N-2,3-dihydroxypropylacetamido)-2,4,6-triiodo-N,N'-bis(2,3-dihydroxypropyl)isophthalamide or diatrizoic acid.

6. The composition of claim 1, wherein the non-ionic density gradient medium contains 5-(N-2,3-dihydroxypropylacetamido)-2,4,6-triiodo-N,N'-bis(2,3-dihydroxypropyl)isophthalamide.

7. The composition of claim 1, comprising from about 1 to about 40% volume/volume of a compound of formula $R^1$—C(X)—$NR^2R^3$,
    wherein $R^1$ is alkyl, haloalkyl, hydroxyalkyl, amino, or alkylamino,
    X is O or S, and
    $R^2$ and $R^3$ are independently H, alkyl, or hydroxyalkyl,
    a salt thereof, or a combination thereof.

8. The composition of claim 1, further comprising a buffer.

9. The composition of claim 8, wherein the buffer is a phosphate-buffered saline.

10. The composition of claim 8, wherein the buffer contains a saponin.

11. The composition of claim 8, wherein the buffer contains ammonium ions, chloride ions, potassium ions, or a combination thereof.

12. The composition of claim 1, further comprising a non-ionic surfactant.

13. The composition of claim 12, wherein the non-ionic surfactant has a polyethylene oxide side chain and an aromatic hydrocarbon group.

14. The composition of claim 1, further comprising 1-thioglycerol.

15. The composition of claim 1 further comprising heparin.

16. The composition of claim 1, further comprising streptokinase.

17. A method for visualizing tissue characteristics comprising:
    (a) fixing a tissue;
    (b) labeling the tissue;
    (c) positioning the tissue in a tissue clearing composition and allowing the tissue clearing composition to permeate the tissue,
    wherein the tissue clearing composition is a composition according to claim 1; and
    (d) imaging the tissue by utilizing a microscope or tissue scanning device.

18. A kit for clearing tissue comprising:
    (a) a tissue clearing composition according to claim 1;
    (b) at least one non-ionic density gradient medium; and
    (c) a vessel for containing the tissue.

19. A tissue clearing composition comprising:
    (a) from about 1 to about 50% volume/volume of a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof;
    (b) from about 1 to about 95% volume/volume of at least one non-ionic density gradient medium containing 5-(N-2,3-dihydroxypropylacetamido)-2,4,6-triiodo-N,N'-bis(2,3-dihydroxypropyl)isophthalamide, fructose, or diatrizoic acid; and
    (c) from about 25 to about 60% volume/volume of a buffer.

20. The composition of claim 19, further comprising from about 0.1 to about 0.5% volume/volume of a non-ionic surfactant.

21. A method for clearing tissue comprising positioning a tissue into a tissue clearing composition and allowing the tissue clearing composition to permeate the tissue, wherein the tissue clearing composition comprises:
(1) a compound of formula $R^1$—C(X)—$NR^2R^3$, wherein $R^1$ is alkyl, haloalkyl, hydroxyalkyl, amino, or alkylamino, X is O or S, and $R^2$ and $R^3$ are independently H, alkyl, or hydroxyalkyl, a salt thereof, or a combination thereof, and
(2) at least one non-ionic density gradient medium containing 5-(N-2,3-dihydroxypropylacetamido)-2,4,6-triiodo-N,N'-bis(2,3-dihydroxypropyl)isophthalamide, fructose, or diatrizoic acid.

* * * * *